United States Patent
Kikuchi (10) Patent No.: US 8,317,580 B2
(45) Date of Patent: Nov. 27, 2012

(54) VIDEO GAME WITH LATENCY COMPENSATION FOR DELAY CAUSED BY FRAME BUFFERING

(75) Inventor: Keiji Kikuchi, Osaka (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 304 days.

(21) Appl. No.: 12/728,693

(22) Filed: Mar. 22, 2010

(65) Prior Publication Data

US 2010/0248826 A1 Sep. 30, 2010

(30) Foreign Application Priority Data

Mar. 24, 2009 (JP) ................. 2009-072620

(51) Int. Cl.
*A63F 9/24* (2006.01)
(52) U.S. Cl. ............. 463/7; 463/2; 463/3; 463/4; 463/5; 463/6; 463/8
(58) Field of Classification Search ............... 463/2–8
See application file for complete search history.

(56) References Cited

U.S. PATENT DOCUMENTS

| | | | |
|---|---|---|---|
| 5,974,442 A | 10/1999 | Adams | |
| 7,803,054 B1 * | 9/2010 | Ogus et al. .............. | 463/42 |
| 7,925,601 B2 * | 4/2011 | Douceur et al. ............ | 706/14 |
| 2002/0142836 A1 | 10/2002 | Nakazato | |
| 2002/0142843 A1 * | 10/2002 | Roelofs ............ | 463/42 |
| 2005/0179701 A1 | 8/2005 | Jahnke | |
| 2005/0192098 A1 * | 9/2005 | Guo et al. .............. | 463/42 |
| 2007/0078003 A1 * | 4/2007 | Sato et al. .............. | 463/43 |
| 2007/0087836 A1 * | 4/2007 | Pasula .............. | 463/43 |
| 2007/0191096 A1 | 8/2007 | Tanaka | |
| 2007/0200855 A1 | 8/2007 | Minagawa | |

(Continued)

FOREIGN PATENT DOCUMENTS

| | | |
|---|---|---|
| EP | 1565035 | 8/2005 |
| EP | 1844823 | 10/2007 |
| JP | 2009-045273 | 3/2009 |

OTHER PUBLICATIONS

Yahn W. Bernier, "Latency Compensation Methods in Client/Server In-Game Protocol Design and Optimization", Internet Citation, XP002347952, Mar. 2001, URL:http://developer.valvesoftware.com/wiki/Latency_Compensating_Methods_in_Clients/Server_In-game_Protocol_Design_and_Optimization (retrieved Oct. 2005).

*Primary Examiner* — Melba Bumgarner
*Assistant Examiner* — Lawrence Galka
(74) *Attorney, Agent, or Firm* — Greenblum & Bernstein, P.L.C.

(57) ABSTRACT

The present invention provides a game apparatus, a game progressing method, and a recording medium that remove dissatisfaction of a player generated when an operation is not reflected on a progressing result of a game in spite of the operation being made at an appropriate timing and enhance entertaining potentialities. If an operation instruction on a player character is received from a player, a time period that has elapsed since a previous state has changed to a current state is measured. When the elapsed time is within a predetermined time, allowable actions in the current state and the previous state are inquired. When the elapsed time is not within the predetermined time, allowable actions in the current state are inquire. Based on an inquiry result, it is determined whether the operation instruction from the player is an allowable action.

7 Claims, 6 Drawing Sheets

FRAME DURING DRAWING = FRAME AS PROCESS REFERENCE

U.S. PATENT DOCUMENTS

2007/0238529 A1 10/2007 Iwamoto et al.
2007/0270225 A1* 11/2007 Wang et al. .................... 463/42
2009/0305758 A1 12/2009 Nomura
2010/0069133 A1 3/2010 Takeda

* cited by examiner

FRAME DURING DISPLAY

[FIG 2B]

FRAME DURING DRAWING
= FRAME AS PROCESS REFERENCE

| STATE | PART | | | | | |
|---|---|---|---|---|---|---|
| | FOOT | LEG | BODY | ARM | HAND | ... |
| STAND | 1 | 0 | 0 | 0 | 0 | ... |
| FALL | 0 | 0 | 0 | 0 | 0 | ... |
| DOWN | 1 | 1 | 1 | 1 | 1 | ... |
| CRAWL | 1 | 1 | 0 | 0 | 1 | ... |
| ... | ... | ... | ... | ... | ... | ... |

| STATE | ACTION | | | | |
|---|---|---|---|---|---|
| | MOVEMENT | JUMP | ATTACK | ROTATION | ... |
| STAND | 1 | 1 | 1 | 1 | ... |
| FALL | 0 | 0 | 1 | 1 | ... |
| DOWN | 0 | 0 | 0 | 0 | ... |
| CRAWL | 1 | 0 | 0 | 1 | ... |
| ... | ... | ... | ... | ... | ... |

VIDEO GAME WITH LATENCY COMPENSATION FOR DELAY CAUSED BY FRAME BUFFERING

CROSS REFERENCE TO RELATED APPLICATION

The present disclosure relates to subject matter contained in Japanese Patent Application No. 2009-072620, field on Mar. 24, 2009, the disclosure of which is expressly incorporated herein by reference in its entirety.

BACKGROUND OF THE INVENTION

1. Field of the Invention

The present invention relates to a game apparatus that controls progressing of a game in accordance with an operation of a player on an input device and displays a progressing result of the game on a display device. More particularly, the present invention relates to a game apparatus that resolves disadvantages generated when processing is not executed at operation timing by the player, and thereby enhances entertaining potentialities. The present invention also relates to a game progressing method and a recording medium.

2. Description of the Related Art

At general video games, when a drawing command is output from a controller of a game apparatus, an image is developed on a frame buffer and then a video signal is output, such that an image is displayed on a display screen of a display device. In the case of such image displaying method, if it takes time to execute drawing process, the coordinates of an object on the display screen which a player views are mismatched with the coordinates of the object processed by the controller. Accordingly, at the present time, in many video games, two (or more) frame buffers are used for drawing images. In such a case, one frame buffer executes the drawing process while an image of the other frame buffer whose drawing is completed is displayed on the display screen, which is alternately repeated for every one frame, thereby displaying a high-definition image at a high speed. However, a screen that the player views at the time of performing an operation actually displays an image of a frame that precedes a frame processed in the game apparatus by at least one frame. Thus, even though the player performs the operation at timing as confirming on the display screen, in actuality, the process is not executed at the timing as he/she confirmed.

For this reason, even though it seems that the player performs the operation without a problem on the display screen at the timing when the player performs the operation, processing by the controller of the game apparatus has already preceded further before the player performs the operation. Therefore, even in a case where the player recognizes that he/she performs the operation at an appropriate right timing, it may turn out that the operation has not been successfully performed. An action game whose object is to cause a player character to overcome various obstacles and achieve a goal is taken as an example. In the action game like this, the player character aims to achieve the goal while walking or running on a ground. On the ground where the player character walks, large ditches are formed in various places. If the player character does not jump over the ditch using the ground as a footing immediately before falling in the ditch, the player character falls in the ditch and the game is over. In this case, the player operates the player character to jump over the ditch immediately before the player character falls in the ditch, while viewing a game image displayed on the display screen. However, at the timing when the player performs the operation, the controller of the game apparatus may regard a state of the player character as a state of "fall", in which the player character does not contact the ground, and may have already executed further processing. Accordingly, even though the player makes the player character jump at an appropriate timing, the player character may fall into the ditch and the game may be over, thereby making the player dissatisfied with the game.

SUMMARY OF THE INVENTION

It is an object of the present invention to provide a game apparatus that can remove dissatisfaction of a player generated when an operation is not reflected on a progressing result of a game in spite of the operation being made at appropriate timing and enhance entertaining potentialities, a game progressing method and a recording medium.

According to a first embodiment of the present invention, there is provided a game apparatus that controls progress of a game in accordance with an operation of a player on an input device and displays a progressing result of the game on a display device. The game apparatus includes an operation instruction receiver that receives an operation instruction to progress the game in accordance with the operation of the player on the input device. The game apparatus also includes a status information storage that stores status information of a progressing state of the game changed depending on the progress of the game in chronological order. The game apparatus also includes a time determiner that determines whether a predetermined time period has elapsed from a time when the status information has changed until a time when the operation instruction is received by the operation instruction receiver. The game apparatus also includes a first operation instruction determiner that determines whether the operation instruction received by the operation instruction receiver is an allowable operation instruction, based on the status information of timing at which the operation instruction is received, in accordance with an allowable operation management table in a case where the time determiner determines that the predetermined time period has elapsed, the allowable operation management table specifying the allowable operation instructions in association with the status information. The game apparatus also includes a second operation instruction determiner that determines whether the operation instruction received by the operation instruction receiver is the allowable operation instruction based on immediately previous status information of the status information of the timing at which the operation instruction is received, which is stored in the status information storage, in accordance with the allowable operation management table, in a case where the time determiner determines that the predetermined time period has not elapsed. The game apparatus also includes a progress controller that controls the progress of the game in accordance with the operation instruction received by the operation instruction receiver, in a case where the first and second operation instruction determiners determine that the operation instruction is the allowable operation instruction. The game apparatus also includes a drawer that draws a game screen to display the progressing result of the game by the progress controller on the display device.

As such, when the predetermined time does not pass from the time when the status information of the progressing state of the game changes until the time when the operation instruction is received, it is determined whether the operation instruction is the allowable operation instruction, based on the immediately previous status information changing to the status information of when the operation instruction is received by the operation instruction receiver. Therefore, dissatisfaction of the player generated when an operation is not reflected on a progressing result of the game in spite of the operation being made at appropriate timing can be removed.

According to a second embodiment of the present invention, there is provided a game apparatus that controls progress of a game in accordance with an operation of a player on an input device and displays a progressing result of the game on a display device. The game apparatus includes an operation instruction receiver that receives an operation instruction to progress the game in accordance with the operation of the player on the input device. The game apparatus also includes a mode determiner that determines a mode of an operation object operated by the player in the game by collision detection with a virtual field in the game. The game apparatus also includes a mode manager that manages a current mode of the operation object determined by the mode determiner, an immediately previous mode of the current mode, and a continuous time of the current mode. The game apparatus also includes an operation instruction determiner that determines whether the operation instruction received by the operation instruction receiver is an allowable operation instruction, in accordance with an allowable operation management table specifying operation instructions for which receptions and executions of operations are allowed in association with every mode. The game apparatus also includes a progressing controller that controls the progress of the game in accordance with the operation instruction in a case where the operation instruction determiner allows the operation instruction. The game apparatus also includes a drawer that draws a game screen to display the progressing result of the game by the progressing controller on the display device. In a case where the mode determiner determines that the mode of the operation object has changed, the mode manager overwrites the mode of the operation object after the change as the current mode of the operation object, overwrites the mode of the operation object before the change as the immediately previous mode, and resets the continuous time of the current mode. In a case where the operation instruction determiner determines that the continuous time of the current mode is within a predetermined time period by inquiring the mode manager, the operation instruction determiner allows not only the operation instruction that is allowable for the current mode but also the operation instruction that is allowable for the immediately previous mode to be received and executed.

As such, when the continuous time of the current mode is within the predetermined range, the receptions and the executions of the operation instruction allowed to the current mode and the operation instruction allowed to the immediately previous mode are allowed. Therefore, dissatisfaction of the player generated when an operation is not reflected on a progressing result of the game in spite of the operation being made at appropriate timing can be removed.

According to a third embodiment of the present invention, there is provided a game apparatus that operates a player character in a virtual space in accordance with an operation of a player on an input device to control progress of a game, and displays a progressing result of the game on a display device. The game apparatus includes an operation instruction receiver that receives an operation instruction to cause the player character to perform an action in accordance with the operation of the player on the input device. The game apparatus also includes a state storage that stores a state of the player character during the progress of the game in a chronological order. The game apparatus also includes a time determiner that determines whether a predetermined time period has elapsed from a time when the state of the player character has changed until a time when the operation instruction is received by the operation instruction receiver. The game apparatus also includes a first action determiner that determines whether the operation instruction received by the operation instruction receiver is an allowable action based on the state of the player character of timing at which the operation instruction is received by the operation instruction receiver in accordance with an allowable action management table in a case where the time determiner determines that the predetermined time period has elapsed, the allowable action management table specifying allowable actions of the player character in association with the states of the player character. The game apparatus also includes a second action determiner that determines whether the operation instruction received by the operation instruction receiver is the allowable action based on the state of the player character immediately before the state of the player character of timing at which the operation instruction is received, which is stored in the state storage in accordance with the allowance action management table, in a case where the time determiner determines that the predetermined time has not elapsed. The game apparatus also includes an action controller that controls the action of the player character in accordance with the operation instruction received by the operation receiver, in a case where the first and second action determiners determine that the operation instruction is the allowable action. The game apparatus also includes a drawer that progresses the game based on the action of the player character and draw a game screen to display the progressing result of the game on the display device.

As such, when the predetermined time does not pass from the time when the state of the player character changes until the time when the operation instruction is received, it is determined whether the operation instruction is the allowable action, based on the state of the player character immediately before the state of the player character of when the operation instruction is received. Therefore, dissatisfaction of the player generated when an operation is not reflected on a progressing result of the game in spite of the operation being made at appropriate timing can be removed. For example, in an action game whose object is to cause the player character to overcome various obstacles and achieve a goal, even though the player performs the operation to cause the player character to jump over a ditch immediately before falling in the ditch in the display screen but the state of the player character becomes a state of "fall" where the player character does not contact the ground in the process in the game apparatus when the operation is performed, the player can cause the player character to jump.

Preferably, the game apparatus further includes a collision detector that detects whether individual parts constituting the player character and an object existing in the virtual space contact each other. The game apparatus also includes a state identifier that identifies the state of the player character based on the part contacting the object, which is detected by the collision detector, according to a state determination table specifying a relation between the part contacting the object and the state of the player character. The game apparatus also includes a state storage that stores the state of the player character identified by the state identifier.

In the virtual space, it is detected whether each part constituting the player character and the object (for example, ground) contact each other, the state of the player character is identified by the contacting part, and the identified state of the player character is stored in the storage in chronological order. In addition, it is determined whether the operation instruction from the player is the allowable operation instruction, based on the stored state of the player character.

The drawer is preferably executed by at least two frame buffers. When the drawer is executed by a plurality of frame buffers such as a double buffer, since a time lag of one frame or more necessarily exists in drawing and display, this configuration is particularly useful.

According to a fourth embodiment of the present invention, there is provided a game progressing method that is executed in a game apparatus, which controls progress of a game in accordance with an operation of a player on an input device and displays a progressing result of the game on a display device. The game progressing method includes receiving an operation instruction to progress the game in accordance with the operation of the player on the input device. The game progressing method also includes storing status information of a progressing state of the game changed depending on the progress of the game in a storage in chronological order. The game progressing method also includes determining whether a predetermined time period has elapsed from a time when the status information has changed until a time when the operation instruction is received. The game progressing method also includes determining whether the received operation instruction is an allowable operation instruction, based on the status information of timing at which the operation instruction is received, in accordance with an allowance operation management table, in a case where it is determined that the predetermined time has elapsed, the allowance operation management table specifying the allowable operation instructions in association with the status information. The game progressing method also includes determining whether the received operation instruction is the allowable operation instruction based on immediately previous status information of the status information of the timing at which the operation instruction is received, which is stored in the storage, in accordance with the allowance operation management table, in a case where it is determined that the predetermined time has not elapsed. The game progressing method also includes controlling the progress of the game in accordance with the received operation instruction, in a case where it is determined that the received operation instruction is the allowable operation instruction. The game progressing method also includes drawing a game screen to display the progressing result of the game on the display device.

According to a fifth embodiment of the present invention, there is provided a recording medium on which recorded is a game program executed in a game apparatus that controls progress of a game in accordance with an operation of a player on an input device and displays a progressing result of the game on a display device. The game program includes an operation instruction receiving code segment that, when executed, receives an operation instruction to progress the game in accordance with the operation of the player on the input device. The game program also includes a status information storing code segment that, when executed, stores status information of a progressing state of the game changed depending on the progress of the game in a chronological order. The game program also includes a time determining code segment that, when executed, determines whether a predetermined time period has elapsed from a time when the status information has changed until a time when the operation instruction is received. The game program also includes a first operation instruction determining code segment that, when executed, determines whether the received operation instruction is an allowable operation instruction, based on the status information of timing at which the operation instruction is received by the operation instruction receiving code segment, in accordance with an allowance operation management table, in a case where the time determining code segment determines that the predetermined time period has elapsed. The game program also includes a second operation instruction determining code segment that, when executed, determines whether the received operation instruction is the allowable operation instruction, based on immediately previous status information of the status information of timing at which the operation instruction is received by the operation instruction receiving code segment, which is stored by the status information storing code segment, in accordance with the allowance operation management table, in a case where the time determining code segment determines that the predetermined time has not elapsed. The game program also includes a progressing controlling code segment that, when executed, controls the progress of the game in accordance with the operation instruction receiving code, in case where the first and second operation instruction determining code segments determines that the operation instruction is the allowable operation instruction. The game program also includes a drawing code segment that, when executed, draws a game screen to display the progressing result of the game by the progressing controlling code segment on the display device.

DETAILED DESCRIPTION OF THE EMBODIMENTS

Figure 1:
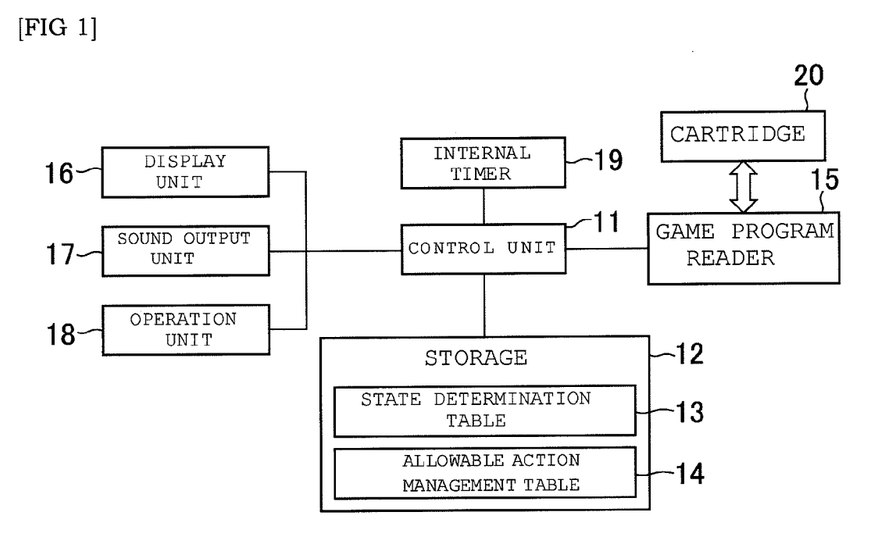
FIG. 1 is a block diagram illustrating a configuration of a game apparatus according to an embodiment of the present invention.

Hereinafter, embodiments of the present invention will be described with reference to the accompanying drawings, but the present invention is not limited to the embodiments. FIG. 1 is a block diagram illustrating a configuration of a game apparatus that executes a video game according to an embodiment of the present invention. The game apparatus includes a control unit 11, a storage 12, a game program reader 15, a display unit 16, a sound output unit 17, and an operation unit 18 (input device), which are connected by an internal bus.

The control unit 11 is composed of, for example, a central processing unit (CPU) and a read only memory (ROM). The control unit 11 executes a program that is read by the game program reader 15 and stored in a cartridge 20 and controls the game apparatus. The control unit 11 includes an internal timer 19. The storage 12 is constituted from a random access memory (RAM), and is provided with a state determination table 13 and an allowable action management table 14 to be described below. The RAM is a work area of the control unit 11.

The game program reader 15 may be configured to read a game program from a DVD/CD-ROM drive having a DVD-ROM or a CD-ROM installed therein, instead of reading the program stored in the cartridge 20. The game program and data stored in the cartridge 20 are read by the game program reader 15 and are loaded to the storage 12.

The control unit 11 reads data needed during progressing of a game from the storage 12 and executes processing. However, since the RAM has a small storage capacity, only data needed in accordance with a progressing situation of the game is loaded from the cartridge 20 to the storage 12. The control unit 11 processes the program and the data that are loaded to the storage 12, outputs a sound output instruction to the sound output unit 17, and outputs a drawing command to a graphics processor (not illustrated). If the control unit 11 outputs a sound output instruction to the sound output unit 17, the sound output unit 17 outputs a sound signal to a speaker. The graphics processor is connected to the display unit 16 having a display screen. When the graphic processor receives the drawing command from the control unit 11, the graphics processor develops an image on a frame memory (frame buffer) and outputs a video signal to display an image on the display screen of the display unit 16. One frame time of the image that is included in the video signal output from the graphics processor is, for example, 1/30 seconds or 1/60 seconds. The graphics processor executes drawing of one image in a frame unit (that is, unit of 1/30 seconds or 1/60 seconds).

The operation unit 18 includes direction keys or a joystick and plural operation buttons, and inputs an operation instruction, such as a movement of a player character through an operation of the direction keys, a jump of the player character, an attack of the player character against another character, and a change in movement speed. Based on input information from the operation unit 18 in response to an operation of a keypad by a player, the control unit 11 executes various calculation processing. The operation unit 18 may include a touch panel in addition to the direction keys and the operation buttons.

The game apparatus according to the embodiment of the present invention may include a communication interface and is connected to a communication network through wireless communication or wire communication. The communication interface can perform wireless communication with another video game apparatus through a communication unit having an antenna.

In the embodiment of the present invention, an action game whose object is to cause the player character to overcome various obstacles and achieve a goal is taken as an example. Due to the advancement of video game apparatuses, in order to draw a high-definition image at a high speed, the following method is generally used at the present time. According to this method, two frame buffers for executing drawing process are provided; one frame buffer executes the drawing process while an image drawn by the other frame buffer is displayed on the display unit, which is alternately repeated for every frame, thereby realizing a high-speed process. In this embodiment, the description is given to the case where two frame buffers are provided, and an image drawn by one frame buffer is displayed while an image to be subsequently displayed is drawn using the other frame buffer.

Figure 2A:
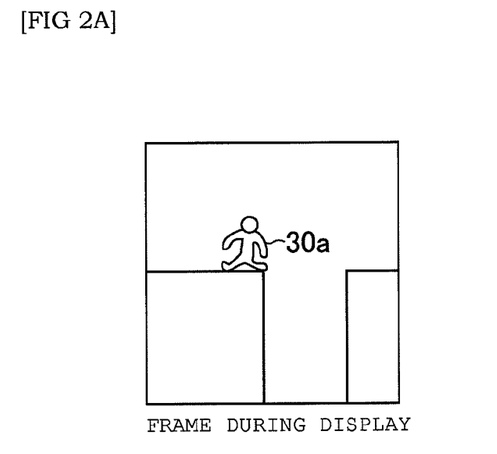
FIGS. 2A and 2B are diagrams illustrating a frame displayed on a display screen and a frame drawn by a frame buffer.
Figure 2B:
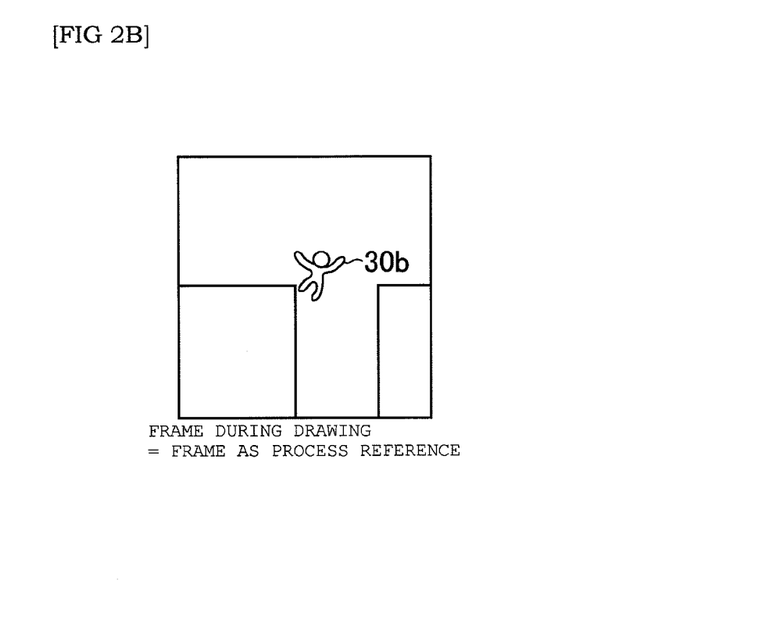

FIGS. 2A and 2B are diagrams illustrating a frame displayed on the display screen and a frame drawn by the frame buffer. In an arbitrary scene of the game, specifically, in a scene that requests a player to perform an operation of causing a player character to jump over a ditch provided in a ground, in a case where the player desires to input the operation instruction of a jump to the player character at the critical timing when the player character falls from the ground, an image as illustrated in FIG. 2A is displayed on the display screen. At this time, however, even though the player inputs the operation instruction of the jump to a player character 30*a* while viewing the image, an image illustrated in FIG. 2B is already drawn in the other frame buffer. Since a player character 30*b* may already start to fall into the ditch, the jump operation may be invalidated.

In this invention, a method that corrects a time lag between contents displayed on the display screen and the process in the controller is disclosed. Specifically, in a case where a "state" of the player character has changed, the operation instruction for the player character's action allowed for an immediately previous state is allowed during several frames starting from the change of the states in addition to the action allowed for a current state.

Figure 3:
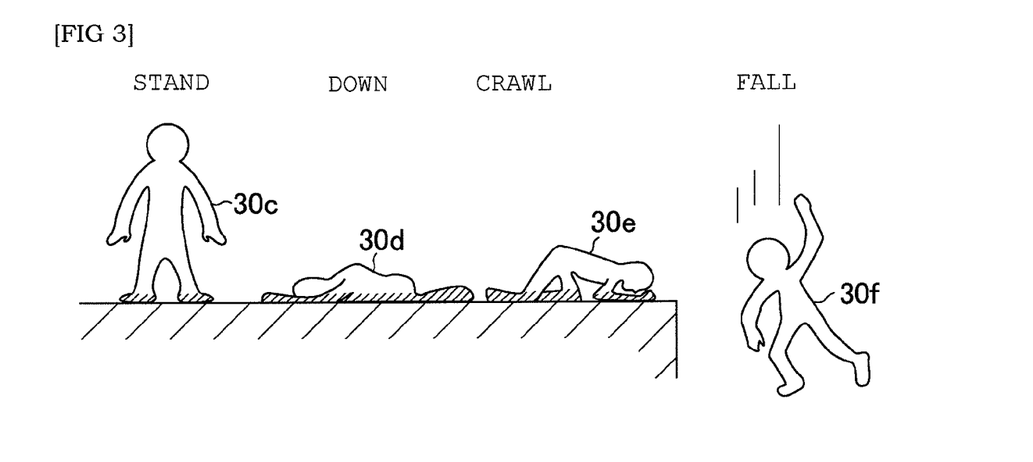
FIG. 3 is a diagram illustrating a display mode in each state of a player character.

Next, the "state" in the embodiment of the present invention will be described. The "state" indicates "a current position or state of the player character". FIG. 3 is a diagram illustrating display modes of respective states of the player character. As illustrated in FIG. 3, for example, "stand", "down", "crawl", and "fall" are set as the states of the player character. A player character 30*c* is in a display mode of the state of "stand". The state of "stand" indicates a state where the player character 30*c* stands on the ground, walks, or runs. If the player performs no operation with respect to the operation unit 18, the state of the player character 30*c* generally becomes a state where the player character only stands on the ground. If the player operates the direction key or the joystick provided in the operation unit 18, the state of the player character can become the state of "stand" where the player character walks or runs. A player character 30*d* is in a display mode of a state of "down". The state of "down" indicates a state where the player character 30*d* is damaged due to an attack from an enemy character and falls down on the ground. The state of "down" may be set to be automatically returned to the state of "stand" after several seconds. A player character 30*e* is in a display mode of a state of "crawl". The state of "crawl" indicates a state where the player character crawls on the ground. The state of the player character becomes the state of "crawl" by downward operating the direction key or the joystick provided in the operation unit 18. A player character 30*f* is in a display mode of a state of "fall". The state of "fall" indicates a state where the player character falls in a direction of the ground due to gravity in a virtual space. The state of the player character is determined by performing collision detection on how a polygon forming an object of the player character contacts with the "ground" in the virtual space of the game.

Figure 4:
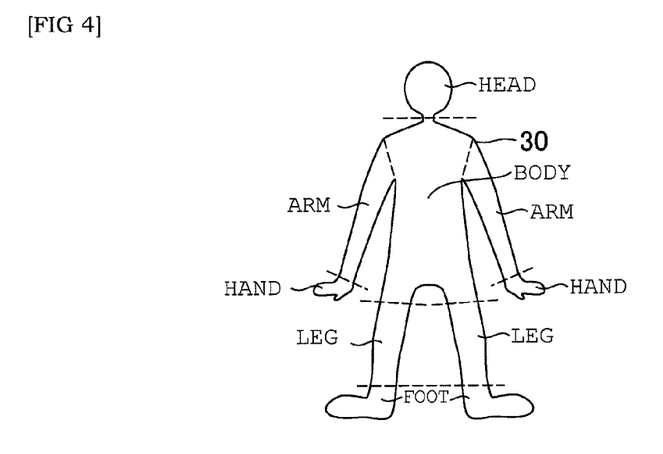
FIG. 4 is a diagram illustrating an example of a division method that is used when individual parts constituting a player character are divided and managed.

FIG. 4 illustrates an example of a division method for dividing and managing individual parts constituting the player character. An object of the player character 30 is formed as an aggregate of a plurality of polygons. In the player character 30, the plurality of polygons are divided into some parts and managed, and collision detection with the ground is performed for each part. That is, it is determined whether individual parts, such as a "head", a "body", "arm", "hand", "leg", and "foot", contacts with a virtual field surface (for example, surface, such as a "cliff" or a "wall", in addition to the "ground") in the game or another object (for example another character). For example, in a case where the player character contacts with the "cliff" or "wall", the states of "climbing" or "sticking" are set. In a case where the player character contacts with another character, the state of "dangling" can be set.

Figure 5:
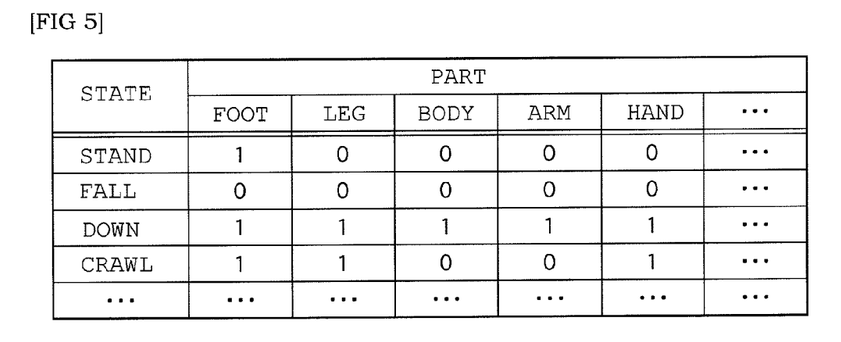
FIG. 5 is a diagram illustrating an example of a state determination table 13.

Specifically, the state determination is performed using the state determination table 13 that is stored in the storage 12. FIG. 5 illustrates an example of the state determination table 13. Hereinafter, a procedure of the state determination according to this embodiment will be described with reference to FIG. 5. In the state determination table 13 of FIG. 5, "1" is stored in a case where the player character contacts with the ground, and "0 (zero)" is stored in a case where the player character does not contact with the ground. The contact state of each part with the ground is recognized by the collision detection. In a case where only the collision detection result of "foot" is "1" and the collision detection results of the other parts are "0", it is determined that the state of the player character is the state of "stand". In a case where it is determined that "all the parts do not contact the ground" as the collision detection results, that is, it is determined that the collision detection results of all the parts are "0", the state of the player character is the state of "fall". In the same way, in a case where it is determined that "all the parts contact the ground" as the collision detection results, that is, it is determined that the collision detection results of all the parts are "1", the state of the player character is the state of "down". In a case where it is determined that the collision detection results of the "foot", the "leg", and the "hand" are "1" and the collision detection results of the "body" and the "arm" are "0", the state of the player character is the state of "crawl".

Next, a relationship between each state and an allowable action with respect to each state will be described. In many video games, in order to realistically implement a motion of the player character, an action for which an operation instruction by the player is allowed is predetermined in association with each state. For example, in a case where the operation instruction of "jump" is input for the player character lying on the ground in the state of "down", if an action like "jump in a state of falling down" is executed, the player character may take a very unnatural motion. If the player inputs an operation instruction of "landing" in spite of the player character being in the state of "stand", the operation instruction may be contradictory to the state of the player character, because the player character is not even in a state of existing in the air.

Figure 6:
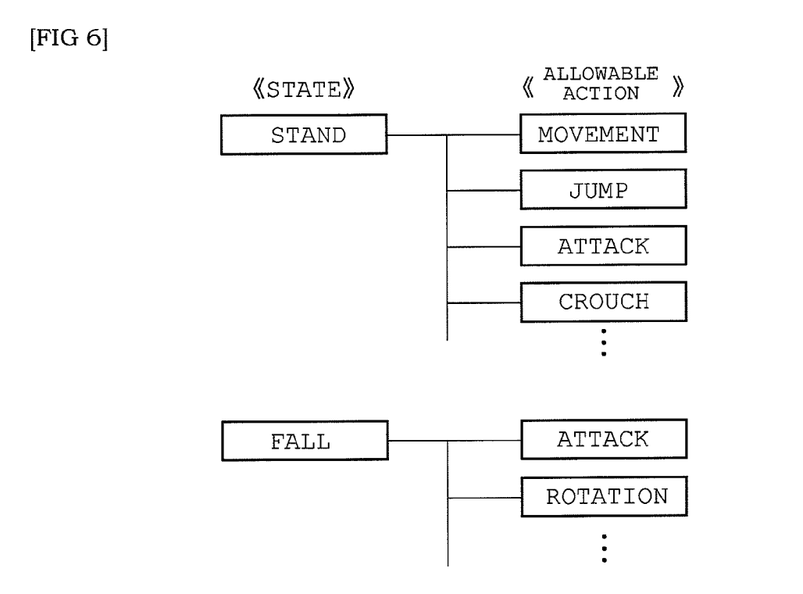
FIG. 6 is a diagram illustrating an allowance action in each state of a player character.

Accordingly, an allowable action in a certain state is limited to an action that is not unnatural when the action is executed in the corresponding state. FIG. 6 illustrates an allowable action in each state of the player character. As illustrated in FIG. 6, the allowable actions in the state of "stand" are "movement", "jump", "attack", and "crouch". In addition, the allowable actions in the state of "fall" are "attack" and "rotation", and actions of "movement" and "jump" are not allowed in the state of "fall".

Figure 7:
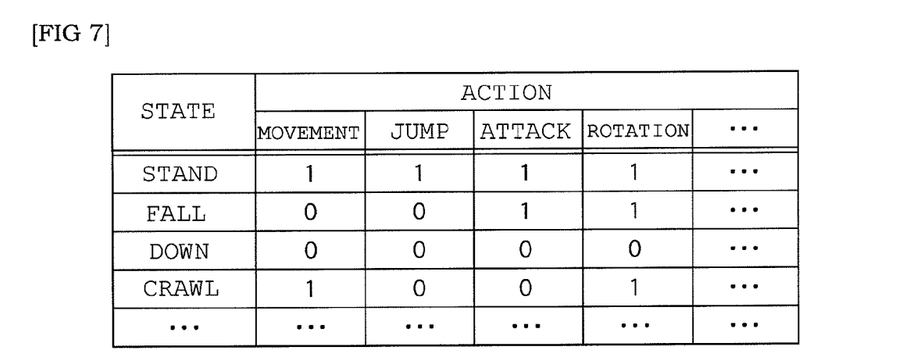
FIG. 7 is a diagram illustrating an example of an allowance action management table 14.

The actions that are allowed in each state are specifically defined in the allowable action management table 14 that is stored in the storage 12. FIG. 7 illustrates an example of the allowable action management table 14. With respect to the allowable action and a non-allowable action in each state, "1" and "0" are stored, respectively. For example, it is determined that the actions of "movement", "jump", "attack", and "rotation" are allowed in the state of "stand". In the state of "fall", the actions of "movement" and "jump" are not allowed, and the actions of "attack" and "rotation" are allowed. In the state of "down", the actions of "movement", "jump", "attack", and "rotation" are not allowed. In the state of "crawl", the actions of "jump" and "attack" are not allowed and the actions of "movement" and "rotation" are allowed.

Figure 8:
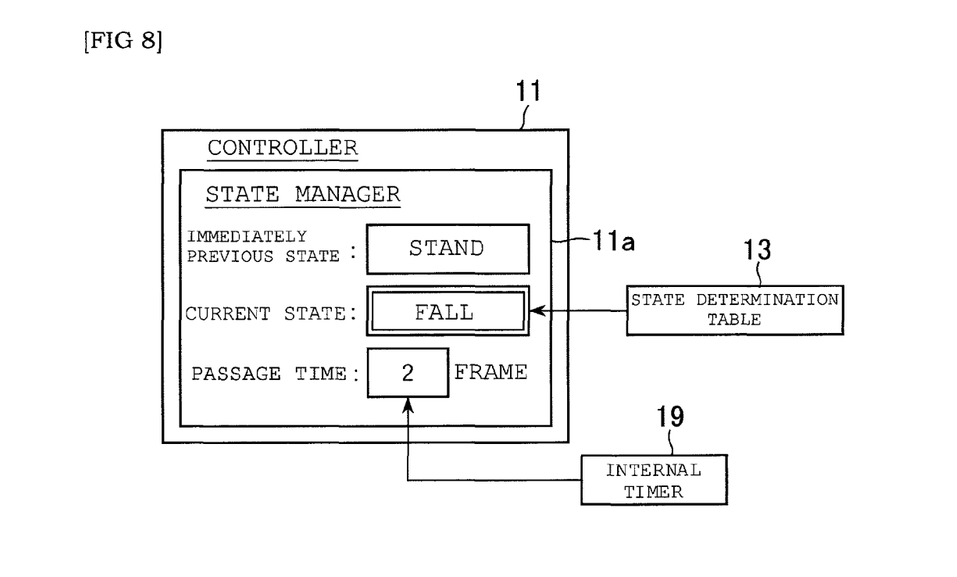
FIG. 8 is a conceptual diagram of a state manager 11a in a control unit 11.

FIG. 8 is a conceptual diagram of a state manager 11a in the control unit 11. In the control unit 11, the state manager 11a is provided. The state manager 11a inquires the internal timer 19 and the state determination table 13 in the storage 12 so as to always manage latest information on "which state" has been continuing during "how many frames" with respect to the current state. The state manager 11a stores current state information of the player character and immediately previous state information of the player character, which information pieces are identified by inquiring the state determination table 13. The state manager 11a also manages a duration time of the current state transmitted from the internal timer 19.

In the state determining process, in a case where it is detected that the state information changes from "stand" to "fall", the state manager 11a changes the current state and the immediately previous state to "fall" and "stand", respectively, and resets the internal timer 19. The internal timer 19 is used to clock the number of frames during which the corresponding state is continued. When the state changes as described above, the internal timer 19 resets a count and starts to clock a continuous time of the new state. In addition, clocking information of the internal timer 19 is always transmitted to the state manager 11a of the control unit 11.

Figure 9:
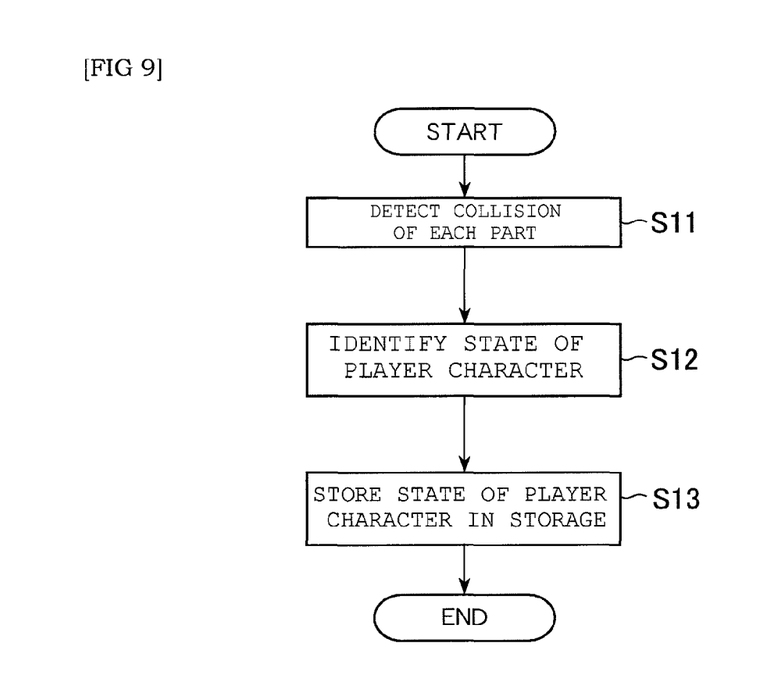
FIG. 9 is a flowchart illustrating a process flow of when collision detection is performed.

Next, a processing procedure of the collision detection will be described with reference to FIG. 9. FIG. 9 is a flowchart illustrating a processing procedure of the collision detection and subsequent steps. First, the collision detection is performed on whether each part of the player character contacts with the ground (step S11). Next, a state of the player character is identified based on the part contacting with the ground, according to the state determination table 13 (step S12). The identified state of the player character is stored in the storage 12 (RAM) together with time information (step S13). The series of processing from steps S11 to S13 are performed for every frame. The state of the player character is stored in a chronological order (in a case where the state changes, the state is stored in association with information on a time of the state change). At least current state information (including a name of the current state and information on a time when the current state switched from the immediately previous state) and immediately previous state information are held in the state manager 11a or the storage 12, and used for determining the allowable action (which will be described below).

Figure 10:
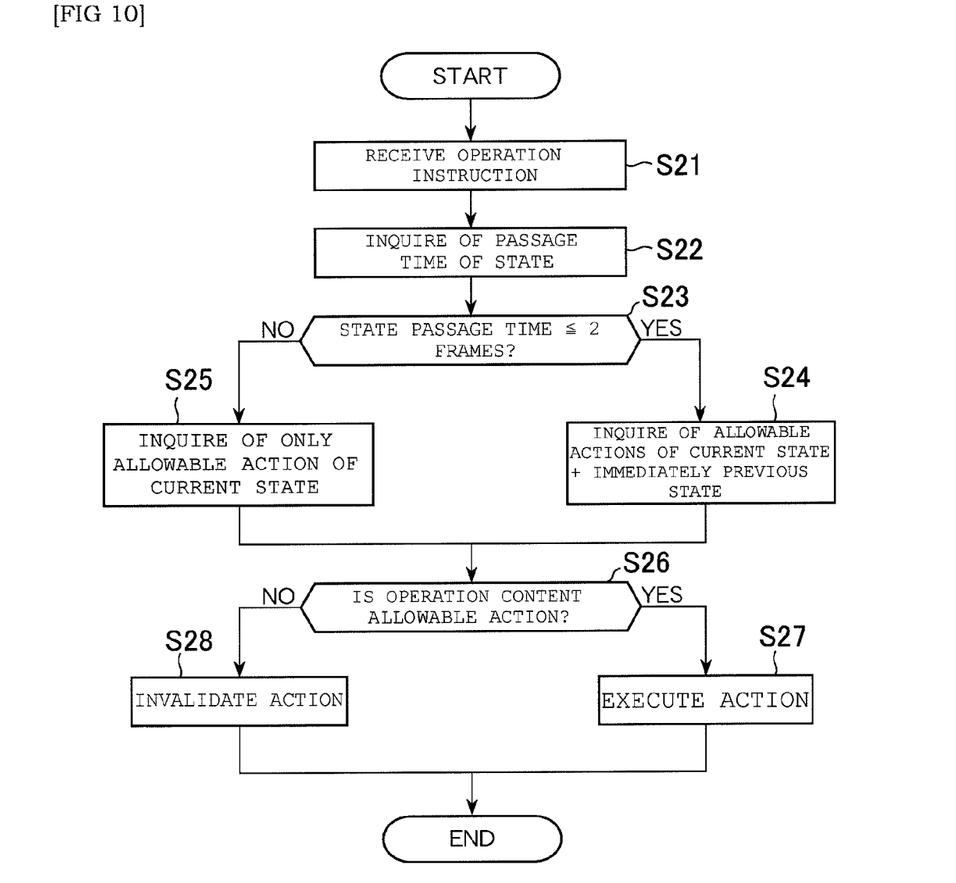
FIG. 10 is a flowchart illustrating a process flow of when an allowance action is determined.

Next, a processing procedure of determining the allowable action will be described with reference to a flowchart of FIG. 10. FIG. 10 is a flowchart illustrating a processing procedure of determination of the allowable action and subsequent steps. First, in a case where the player operates the operation unit 18 and an operation instruction with respect to the player character is received (step S21), the control unit 11 inquires the state manager 11a of a time period elapsed since the state of the player character has changed to the current state (step S22). The control unit 11 may be configured to calculate the time elapsed since the state of the player character has changed to the current state based on the state information stored in the storage 12 in a chronological order.

In a case where the elapsed time is within a predetermined time (in this example, the predetermined time is two frames, but may be appropriately set in accordance with a kind of each game or may be set by a user) (YES in step S23), the control unit 11 determines that the elapsed time is within a display error range. Then, the control unit 11 inquires for the allowable action corresponding to the current state of the player character and the allowable action corresponding to the immediately previous state, based on the allowance action management table (step S24). In step S24, the control unit 11 simultaneously inquires for the allowable action corresponding to the current state of the player character and the allowable action corresponding to the immediately previous state. However, the control unit 11 may not inquire for the allowable action corresponding to the current state of the player character and may inquire of only the allowable action corresponding to the immediately previous state. Meanwhile, in a case where the elapsed time exceeds the predetermined time (NO in step S23), the control unit 11 determines that the elapsed time is beyond the display error range, and inquires for only the allowable action corresponding to the current state, based on the allowance action management table (step S25).

Next, the control unit 11 determines whether the action for which the player instructs to operate is an allowable action, based on the inquired allowable action (step S26). As a result, when it is determined that the action that the player instructs to operate is the allowable action (YES in step S26), the control unit 11 executes the corresponding action (step S27). In a case where it is determined that the action is not the allowable action (NO in step S26), the control unit 11 does not execute the corresponding action and executes processing for invalidating such an action (step S28). The series of processing from steps S21 to S28 are repetitively executed whenever the operation instruction from the operation unit 18 is made.

For example, in a case where the state changes from "stand" to "fall" and the player inputs the operation instruction of "jump" within two frames, in the conventional art, since the operation of "jump" is a non-allowable action in the state of "fall", the processing for invalidating the action of "jump" is executed. However, in this invention, since it is determined that the elapsed time is within the display error range (that is, in this example, within two frames after the state changes), in a case where the action corresponds to either one of the allowable actions of "stand" and "fall", the reception and execution of the corresponding action are allowed. Thus, in spite of the player character being in the state of "fall" in fact, the operation of "jump" is received and the corresponding action is executed. As a result, even in a case where the player character falls in the ditch provided in the ground and the game is over as in the conventional art, the player character can jump over the ditch and continuously play the game in the present invention.

In the above-described embodiment, the two frame buffers are used in this embodiment, but three or more frame buffers may be used. If the three or more frame buffers are used, a high-definition image can be processed at a high speed. In this case, since the time lag increases, the effect of this embodiment also increases. In the case of a double buffer, since a time lag of one frame necessarily exists between drawing processing and display processing, this configuration is particularly useful. In a liquid crystal TV that mounts a drawing engine, since a time lag of several frames may be generated in updating images, this configuration is very useful. Even when an image is drawn using a single buffer, a time lag is generated between an image displayed on the display screen and processing in the control unit 11. Therefore, the present invention can be applied to the case of using the single buffer.

The present invention is effective to a game which has a frame rate of 30 frames per second rather than a game which have a frame rate of 60 frames per second (because the shortest time lags are 1/30 second and 1/60 second, respectively).

Meanwhile, in a game where plural game terminals match each other while performing wireless communication, in order to efficiently use the drawing engine and increase the processing speed, packets that are transmitted to the drawing engine are also processed by the double buffer. For example, a case where the state of the player character sequentially changes to a state A (for example, "stand"), a state B (for example, "run"), and a state C (for example, "fall") for every frame will be described.

First, in a first frame, a calculation result (that is, state A) is transmitted in packets to the other game terminals. In a second frame, a next calculation result (that is, state B) is transmitted in packets to the other game terminals. In the second frame, in parallel with the transmission of the calculation result of the state B, the state A transmitted in the first frame is processed with drawing calculation by the drawing engine and is written in a buffer 1.

In a third frame, a calculation result (that is, state C) is transmitted in packets to the other game terminals. In the third frame, in parallel with the transmission of the calculation result of the state C, the state B transmitted in the second frame is processed with drawing calculation by the drawing engine and is written in a buffer 2. Further, in the third frame, the state A written in the buffer in the second frame 1 is displayed on the screen.

Similar to the third frame, in a fourth frame, the calculation result (that is, state C) is transmitted in packets to the other game terminals. In the fourth frame, in parallel with the transmission of the calculation result, the state C transmitted in the third frame is processed with drawing calculation by the drawing engine and is written in the buffer 1. Further, in the third frame, the state B written in the buffer 2 is displayed on the screen.

Similar to the fourth frame, in a fifth frame, the calculation result (that is, state C) is transmitted in packets to the other game terminals. In the fifth frame, in parallel with the transmission of the calculation result, the state C transmitted in the fourth frame is processed with drawing calculation by the drawing engine and is written in the buffer 2. Further, in the fourth frame, the state C written in the buffer 1 is displayed on the screen.

In a case where the plural game terminals play a game via wireless communication, the players view the state C (fall), which occurred in the third frame, in the fifth frame. That is, a time lag is necessarily generated by two frames between the transmission of the packets and the display. In a case where thirty frames are processed per second, the time lag becomes 2/30 seconds. Accordingly, the present invention can be also applied to a case where plural game terminals play a game via wireless communication. That is, if the predetermined time is set as two frames (2/30 second) and the action that is allowed in the state before the change is made to be allowable within two frames after the state changes, the action of "jump" is allowed in the forth frame, in spite of that the state of "run" is displayed on the display screen the player character is in the state of "fall" in the buffer.

In the above-described embodiment, the description is given on the assumption of the action game. However, the present invention can be applied to a car racing game, a sport game such as a baseball, a tennis and a golf, and a shooting game. In particular, if the present invention can be applied to a game where a game result depends on a precise timing measurement, a superior effect can be obtained.

In the above-described embodiment, the humanoid player character that is operated by the player is taken as an example, but the present invention can be applied to an object that is operated by the player. For example, the case where the present invention is applied to a car racing game will be described below. In the car racing game, the player operates a car running a predetermined course while competing with a car operated by a CPU or a car operated by another player, and aims at the finish line. In the course along which the car runs, various obstacles are installed. For example, if the car runs over a "banana" on the course, the car becomes in a "slip" state, and the player cannot operate the car. When the car is in a "normal" state, operation instructions, such as "acceleration", "deceleration", and "use of a special item", are allowed. However, when the car is in the "slip" state, the operation instructions, such as "acceleration", "deceleration", and "use of a special item", are not allowed. In this game, if the player inputs an operation instruction of "use of a special item" at timing immediately before the car travels on the "banana" (before 1/30 second or 1/60 second) on the display screen that the player views, in the process of the control unit 11, even though the car is in the "slip" state, the operation instructions in the "normal" state are also allowed. Therefore, the operation instruction of "use of a special item" is allowed. By the "use of a special item", the car operated by the player becomes in a so-called "undefeatable" state where the car is not in the "slip" state, even though the car runs over the "banana". As a result, the car is able to run the course under an advantageous condition as compared with the other cars.

In the above-described embodiment, the description is given to the case where the present invention is applied to the game in which the allowance action is determined based on the state of the player character (including the object such as the car in the car racing game) operated by the player. Further, the present invention can be applied to a game in which an allowed operation instruction is determined based on status information (for example, a time, a remaining force value of the player character, and a score acquired by the player) of a progressing state of the game (other than the state of the player character). For example, the present invention can be applied to a game in which a special item is allowed to be used within a specific time, but is prohibited to be used after the specific time. That is, if the present invention is applied to a case where a progressing status of the game changes depending on within the specific time or not and the use of the special item is allowed or prohibited depending thereon, the special item can be used even though the player performs an operation to use the special item at the timing just before the specific time is expired (the timing when the specific time will be expired after 1/30 or 1/60 second in the display screen).

What is claimed is:

1. A game apparatus that controls a progress of a game in accordance with an operation of a player on an input device and displays a progressing result of the game on a display device, the game apparatus comprising:
    at least one central processor; at least one graphics processor
    an operation instruction receiver that receives an operation instruction from the input device in accordance with the operation of the player on the input device;
    a status information storage that stores, in a memory, status information of a progressing state of the game, the status information being changed from a previous state to a current state during the progress of the game, the previous state and the current state being in a chronological order;
    a time determiner that determines, with the at least one central processor, whether a predetermined time period has elapsed from when the status information changed from the previous status to the current status until when the operation instruction is received by the operation instruction receiver;
    a first operation instruction determiner that determines, with the at least one central processor, whether the operation instruction received by the operation instruction receiver is an allowable operation instruction based on the current status and in accordance with an allowable operation management table when the time determiner determines that the predetermined time period has elapsed, the allowable operation management table specifying allowable operation instructions in association with each of the previous state and the current state;
    a second operation instruction determiner that determines, with the at least one central processor, whether the operation instruction received by the operation instruction receiver is the allowable operation instruction based on the previous state and in accordance with the allowable operation management table when the time determiner determines that the predetermined time period has not elapsed;
    a progress controller that controls, with the at least one central processor, the progress of the game in accordance with the operation instruction received by the operation instruction receiver when one of the first operation instruction determiner and the second operation instruction determiner determines that the operation instruction is the allowable operation instruction; and
    a drawer that draws, with the at least one graphics processor, the progressing result of the game on the display device in accordance with the progress of the game controlled by the progress controller.

2. A game apparatus that controls a progress of a game in accordance with an operation of a player on an input device and displays a progressing result of the game on a display device, the game apparatus comprising:
    at least one central processor; at least one graphics processor
    an operation instruction receiver that receives an operation instruction from the input device in accordance with the operation of the player on the input device;
    a mode determiner that determines, with the at least one central processor, a mode of an operation object operated by the player in the game by collision detection with a virtual field in the game;
    a mode manager that manages, in a memory, a current mode of the operation object determined by the mode determiner, an immediately previous mode of the current mode, and a time of the current mode from when the immediately previous mode changed to the current mode;
    an operation instruction determiner that determines, with the at least one central processor, whether the operation instruction received by the operation instruction receiver is an allowable operation instruction in accordance with an allowable operation management table, the allowable operation management table specifying allowable operation instructions for which receptions and executions of operations are allowed in association with each of the current mode and the immediately previous mode;
    a progressing controller that controls, with the at least one central processor, the progress of the game in accordance with the operation instruction when the operation instruction determiner determines that the operation instruction is the allowable operation instruction; and
    a drawer that draws, with the at least one graphics processor, the progressing result of the game on the display device in accordance with the progress of the game controlled by the progressing controller,
    wherein, when the mode determiner determines that the mode of the operation object has changed from the immediately previous mode to the current mode, the mode manager overwrites the mode of the operation object after the change as the current mode overwrites the mode of the operation object before the change as the immediately previous mode, and resets the time of the current mode, wherein, when the operation instruction determiner determines that the time of the current mode is within a predetermined time period by inquiring the mode manager, the operation instruction determiner determines whether the operation instruction is the allowable operation instruction based on the current mode and the immediately previous mode.

3. A game apparatus that operates a player character in a virtual space in accordance with an operation of a player on an input device to control a progress of a game, and displays a progressing result of the game on a display device, the game apparatus comprising:

at least one central processor; at least one graphics processor an operation instruction receiver that receives an operation instruction from the input device to cause the player character to perform an action, the operation instruction being received in accordance with the operation of the player on the input device;

a state storage that stores, in a memory, a current state of the player character during the progress of the game, the current state being changed from a previous state during the progress of the game, the previous state and the current state being in a chronological order;

a time determiner that determines, with the at least one central processor, whether a predetermined time period has elapsed from when the current state of the player character changed from the previous state until when the operation instruction is received by the operation instruction receiver;

a first action determiner that determines, with the at least one central processor, whether the operation instruction received by the operation instruction receiver is an allowable action based on the current state of the player character and in accordance with an allowable action management table when the time determiner determines that the predetermined time period has elapsed, the allowable action management table specifying allowable actions of the player character in association with each of the current state and the previous state of the player character;

a second action determiner that determines, with the at least one central processor, whether the operation instruction received by the operation instruction receiver is the allowable action based on the previous state of the player character and in accordance with the allowable action management table when the time determiner determines that the predetermined time period has not elapsed;

an action controller that controls, with the at least one central processor, the action of the player character in accordance with the operation instruction received by the operation input receiver when one of the first action determiner and the second action determiner determines that the operation instruction is the allowable action; and a drawer that draws, with the at least one graphics processor, the progressing result of the game on the display device in accordance with the action of the game player character.

4. The game apparatus according to claim 3, further comprising:

a collision detector that detects whether individual parts constituting the player character and an object existing in the virtual space contact each other;

a state identifier that identifies the current state of the player character based on the individual parts contacting the object, which are detected by the collision detector, according to a state determination table specifying relations between the individual parts contacting the object and the current state of the player character; and a state storage that stores the current state of the player character identified by the state identifier.

5. The game apparatus according to claim 1, wherein the drawer is executed by at least two frame buffers.

6. A game progressing method that is executed in a game apparatus, which controls a progress of a game in accordance with an operation of a player on an input device and displays a progressing result of the game on a display device, the game progressing method comprising:

receiving an operation instruction from the input device in accordance with the operation of the player on the input device;

storing, in a memory, status information of a progressing state of the game, the status information being changed from a previous state to a current state during the progress of the game, the previous state and the current state being in a chronological order;

determining, with at least one central processor, whether a predetermined time period has elapsed from when the status information changed from the previous status to the current status until when the operation instruction is received;

determining, with the at least one central processor, whether the operation instruction is an allowable operation instruction based on the current status and in accordance with an allowance operation management table when it is determined that the predetermined time period has elapsed, the allowance operation management table specifying allowable operation instructions in association with each of the previous state and the current state;

determining, with the at least one central processor, whether the operation instruction is the allowable operation instruction based on the previous state and in accordance with the allowance operation management table, when it is determined that the predetermined time period has not elapsed;

controlling, with the at least one central processor, the progress of the game in accordance with the operation instruction when it is determined that the operation instruction is the allowable operation instruction; and drawing, with at least one graphics processor, the progressing result of the game on the display device in accordance with the progress of the game.

7. A non-transitory recording medium including a game program that is executed in a game apparatus, controls a progress of a game in accordance with an operation of a player on an input device, and displays a progressing result of the game on a display device, the game program comprising:

an operation instruction receiving code segment that, when executed, receives an operation instruction from the input device in accordance with the operation of the player on the input device;

a status information storing code segment that, when executed, stores status information of a progressing state of the game, the status information being changed from a previous state to a current state during the progress of the game, the previous state and the current state being in a chronological order;

a time determining code segment that, when executed, determines whether a predetermined time period has elapsed from when the status information changed from the previous status to the current status until when the operation instruction is received;

a first operation instruction determining code segment that, when executed, determines whether the operation instruction is an allowable operation instruction based on the current status and in accordance with an allowable operation management table when the time determining code segment determines that the predetermined time period has elapsed, the allowable operation management table specifying allowable operation instructions in association with each of the previous state and the current state;

a second operation instruction determining code segment that, when executed, determines whether the operation instruction is the allowable operation instruction based on the previous state and in accordance with the allowance operation management table when the time determining code segment determines that the predetermined time period has not elapsed;

a progressing controlling code segment that, when executed, controls the progress of the game in accordance with the operation instruction received by the operation instruction receiving code, when one of the first operation instruction determining code segment and the second operation instruction determining code segment determines that the operation instruction is the allowable operation instruction; and a drawing code segment that, when executed, draws the progressing result of the game on the display device in accordance with the progress of the game controlled by the progressing controlling code segment.

* * * * *